(12) United States Patent
Kozaka et al.

(10) Patent No.: US 8,749,102 B2
(45) Date of Patent: Jun. 10, 2014

(54) ELECTRIC MOTOR

(75) Inventors: Akira Kozaka, Hirakata (JP); Yasuhiko Matsuki, Fujisawa (JP); Akira Minamiura, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 13/814,378

(22) PCT Filed: Jun. 19, 2012

(86) PCT No.: PCT/JP2012/065635
§ 371 (c)(1),
(2), (4) Date: Feb. 5, 2013

(87) PCT Pub. No.: WO2012/176774
PCT Pub. Date: Dec. 27, 2012

(65) Prior Publication Data

US 2014/0097712 A1    Apr. 10, 2014

(30) Foreign Application Priority Data

Jun. 20, 2011   (JP) .................................. 2011-136616

(51) Int. Cl.
*H02K 9/19*    (2006.01)
*H02K 9/26*    (2006.01)
*H02K 5/20*    (2006.01)
*H02K 29/06*   (2006.01)

(52) U.S. Cl.
USPC .............................. 310/61; 310/52; 310/68 B

(58) Field of Classification Search
USPC ....................... 310/52, 54, 61, 68 B
See application file for complete search history.

(56) References Cited

U.S. PATENT DOCUMENTS

| 4,035,679 | A  | * | 7/1977  | Schmohe ........................ 310/61 |
| 5,589,720 | A  | * | 12/1996 | Berger ............................ 310/61 |
| 5,882,182 | A  | * | 3/1999  | Kato et al. ..................... 417/366 |
| 7,156,195 | B2 | * | 1/2007  | Yamagishi et al. ........... 180/65.1 |
| 7,834,492 | B2 | * | 11/2010 | Iund et al. ....................... 310/52 |

FOREIGN PATENT DOCUMENTS

| CN | 1182506 A | 5/1998 | |
| CN | 1667918 A | * 9/2005 | |
| JP | 6-217496 | * 8/1994 | ............... H02K 9/20 |

(Continued)

OTHER PUBLICATIONS

International Search Report dated Sep. 25, 2012, issued for PCT/JP2012/065635.

(Continued)

*Primary Examiner* — Burton Mullins
(74) *Attorney, Agent, or Firm* — Edwards Wildman Palmer LLP

(57) ABSTRACT

An electric motor includes: a shaft having an internal cooling medium passageway; a cooling medium supply portion provided inside a housing at a side of one end of the shaft and supplying a cooling medium to the internal cooling medium passageway; a rotation angle detection sensor attached at the side of the one end of the shaft and detecting a rotation angle of the shaft; a push member including a penetration hole through which the cooling medium supplied from the cooling medium supply portion passes and interposed between the cooling medium supply portion and the one end of the shaft to guide the cooling medium to the internal cooling medium passageway and pressing the rotation angle detection sensor from the side of the one end of the shaft; and a connector holding a terminal connected to a signal cable from the rotation angle detection sensor and attached to the housing.

6 Claims, 11 Drawing Sheets

(56) References Cited

FOREIGN PATENT DOCUMENTS

| | | |
|---|---|---|
| JP | 11-041861 A | 2/1999 |
| JP | 2007-020337 A | 1/2007 |
| JP | 2009-213275 A | 9/2009 |
| WO | WO-97/29535 A1 | 8/1997 |
| WO | WO-2011/158685 A1 | 12/2011 |

OTHER PUBLICATIONS

Office Action dated Mar. 6, 2014, issued for the German patent application No. 11 2012 002 552.0 and English translation thereof.

* cited by examiner

ELECTRIC MOTOR

FIELD

The present invention relates to an electric motor in which a shaft rotation angle detection sensor is provided inside a housing.

BACKGROUND

An electric motor is used for various purposes. For example, Patent Literature 1 discloses an electric motor in which a rotor and a stator are cooled by a cooling medium such as oil.

CITATION LIST

Patent Literature

Patent Literature 1: Japanese Patent Application Laid-open No. 2007-020337

SUMMARY

Technical Problem

The electric motor is used to detect and control the rotation angle of the shaft attached with the rotor by the rotation angle detection sensor such as the resolver. Since the rotation angle detection sensor is generally attached to the inside of the housing of the electric motor, there is a need to make an effort for an operation of extracting the cable extracting the output from the rotation angle detection sensor to the outside of the housing when assembling the electric motor. Further, in a case where the rotation angle detection sensor is fixed to the inside of the housing and the space provided with the rotation angle detection sensor is sealed, it is difficult to ensure the precision of the member when obtaining both functions by one member. It is an object of the invention to suppress degradation in precision necessary for a member used to fix a rotation angle detection sensor and to seal a space provided with the rotation angle detection sensor by simplifying an operation of extracting a cable, extracting an output from the rotation angle detection sensor, to the outside of a housing in an electric motor in which the rotation angle detection sensor is provided inside the housing.

Solution to Problem

To overcome the problems and achieve the object, according to the present invention, an electric motor comprises: a shaft which is attached with a rotor and has an internal cooling medium passageway formed therein so that a cooling medium passes therethrough; a housing which has the shaft disposed therein and rotatably supports the shaft; a cooling medium supply portion which is provided inside the housing at a side of one end of the shaft and supplies the cooling medium to the internal cooling medium passageway; a rotation angle detection sensor which is attached at the side of the one end of the shaft and detects a rotation angle of the shaft; a push member which includes therein a penetration hole through which the cooling medium supplied from the cooling medium supply portion passes and is interposed between the cooling medium supply portion and the one end of the shaft to guide the cooling medium to the internal cooling medium passageway and presses the rotation angle detection sensor from the side of the one end of the shaft; and a connector which holds a terminal electrically connected to one end of a signal cable for outputting an output of the rotation angle detection sensor and is attached to the housing.

According to the present invention, the housing provided with the cooling medium supply portion includes a concave portion to which the push member is fitted.

According to the present invention, the push member is fitted to the concave portion and includes a space between an end surface opposite to a side at which the push member presses the rotation angle detection sensor and the concave portion.

According to the present invention, the push member is fixed to the housing by a plate-like member.

According to the present invention, the terminal held by the connector is drawn in a direction perpendicular to a rotation center axis of the shaft.

According to the present invention, an electric motor which rotationally drives an upper swing body of a construction machine, the electric motor comprises: a shaft which is attached with a rotor and has an internal cooling medium passageway formed therein so that a cooling medium passes therethrough; a housing which has the shaft disposed therein and rotatably supports the shaft; a cooling medium supply portion which is provided inside the housing at a side of one end of the shaft and is disposed at an upper side of the housing so as to supply the cooling medium to the internal cooling medium passageway; a rotation angle detection sensor which is attached at the side of the one end of the shaft and detects a rotation angle of the shaft; a push member which includes therein a penetration hole through which the cooling medium supplied from the cooling medium supply portion passes and is interposed between the cooling medium supply portion and the one end of the shaft to guide the cooling medium to the internal cooling medium passageway and presses the rotation angle detection sensor from the side of the one end of the shaft; a plate-like fixation member which fixes the push member to the housing; a connector which holds a terminal electrically connected to one end of a signal cable for outputting an output of the rotation angle detection sensor and is attached to the housing to draw the terminal in a direction perpendicular to a rotation center axis of the shaft; a concave portion which is provided in the housing provided with the cooling medium supply portion and is fitted to a part of the push member; and seal members which are provided between the concave portion and the push member and between the push member and the shaft, respectively.

According to the invention, it is possible to suppress degradation in precision necessary for a member used to fix a rotation angle detection sensor and to seal a space provided with the rotation angle detection sensor by simplifying an operation of extracting a cable, outputting an output from the rotation angle detection sensor, to the outside of a housing in an electric motor in which the rotation angle detection sensor is provided inside the housing.

DESCRIPTION OF EMBODIMENTS

Figure 1:
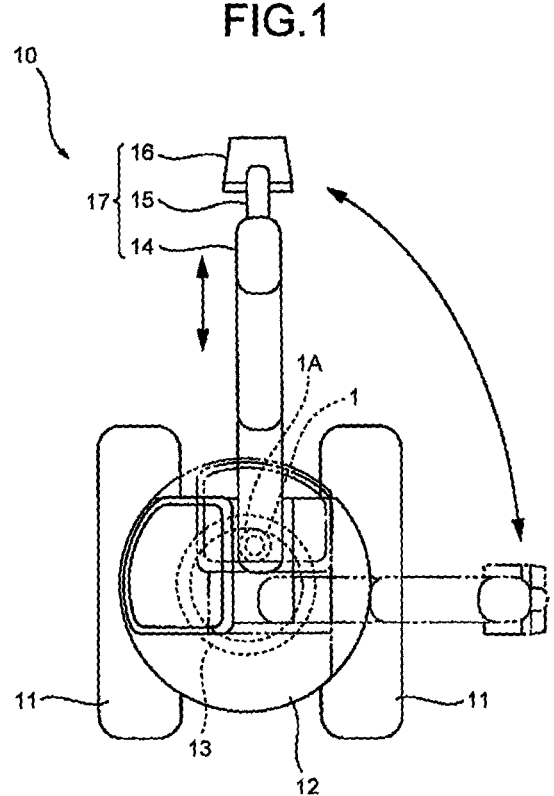
FIG. 1 is a plan view illustrating a hybrid excavator which uses an electric motor according to an embodiment as a swing electric motor.

A mode for carrying out the invention (an embodiment) will be described in detail by referring to the drawings. The invention is not limited to the content described in the embodiment. Further, the constituents described below include a constituent that may be easily supposed by the person skilled in the art and a constituent that substantially has the same configuration. Further, the constituents described below may be appropriately combined with each other. Further, various omissions, replacements, or modifications of the constituents may be made without departing from the spirit of the invention.

<Hybrid Excavator>

FIG. 1 is a plan view illustrating a hybrid excavator which uses an electric motor according to the embodiment as a swing electric motor. A hybrid excavator 10 includes a pair of left and right crawlers 11 which constitutes a lower running body, an upper swing body 12, a swing circle 13 which connects the lower running body to the upper swing body 12, an electric motor 1 which serves as a swing motor, a swing pinion 1A, a boom 14, an arm 15, and a bucket 16, and also includes an operating machine 17 which is attached to the upper swing body 12.

The pair of left and right crawlers 11 is driven by a right running hydraulic motor and a left running hydraulic motor so that the hybrid excavator 10 runs. The upper swing body 12 swings by the electric motor 1 which serves as the swing motor. An outer race of the swing circle 13 is fixed to the upper swing body 12, and an inner race of the swing circle 13 is fixed to the lower running body. With such a structure, the swing circle 13 connects the upper swing body 12 to the lower running body. The electric motor 1 is provided so that the input and output shaft of the electric motor 1 faces the gravity action direction when the electric motor is vertically installed, that is, the hybrid excavator 10 is installed in the horizontal plane. The input and output shaft of the electric motor 1 is connected to the swing pinion 1A through a swing machinery with a speed reduction mechanism. The swing pinion 1A meshes with the internal tooth attached to the inner race of the swing circle 13. The driving force of the electric motor 1 is transmitted to the swing pinion 1A through the swing machinery so that the upper swing body 12 swings. The boom 14, the arm 15, and the bucket 16 are respectively driven by the hydraulic cylinders for the boom 14, the arm 15, and the bucket 16 through a control valve using hydraulic oil which is pressure-fed from a hydraulic pump (not illustrated), whereby an operation such as excavation is performed.

The hybrid excavator 10 drives the generator and the hydraulic pump by an internal combustion engine and drives the electric motor 1 through an inverter (not illustrated) by the power of the generator so as to swing the upper swing body 12. Further, the hybrid excavator 10 generates a braking force necessary when stopping the upper swing body 12 by using the electric motor 1 as the generator and stores electric power generated by the electric motor 1 through the braking force in an electric storage device such as a capacitor or a secondary battery. In this way, the hybrid excavator 10 is a so-called hybrid type construction vehicle. In the embodiment, an example will be described in which the electric motor 1 is used as the swing motor of the hybrid excavator 10 as one kind of the construction vehicle, but the application target of the electric motor 1 is not limited thereto. Furthermore, the hybrid excavator 10 may be of a type which does not include an internal combustion engine, that is, a type which is driven by the electric power of the electric storage device. Next, the structure of the electric motor 1 will be described.

<Electric Motor Structure>

Figure 2:
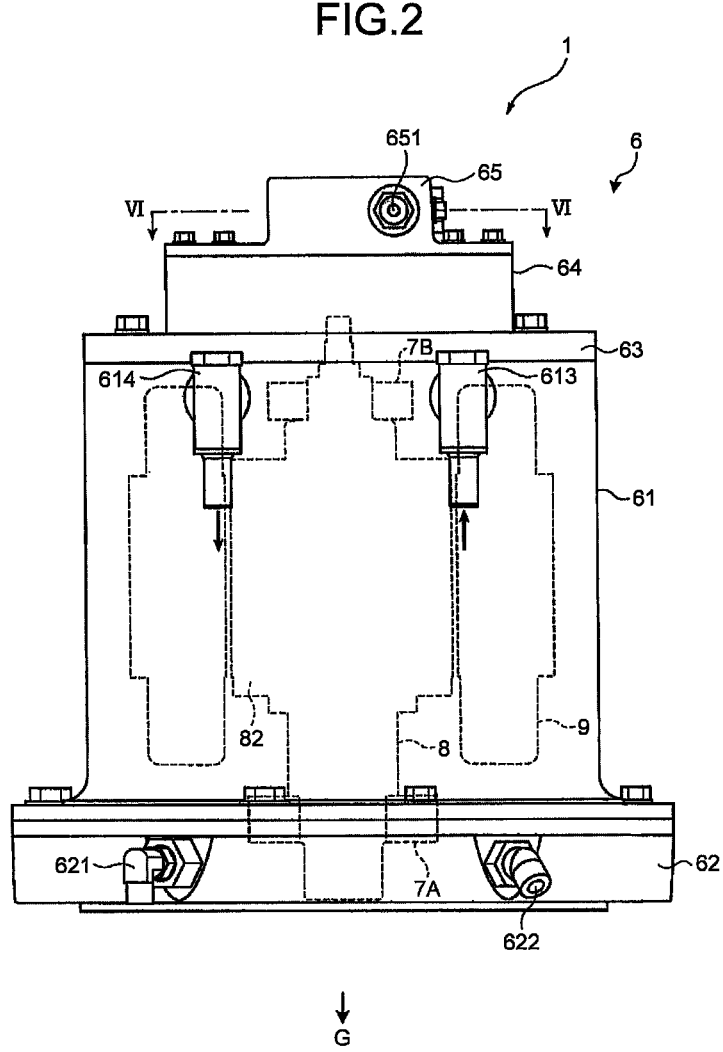
FIG. 2 is a front view illustrating the electric motor according to the embodiment.
Figure 3:
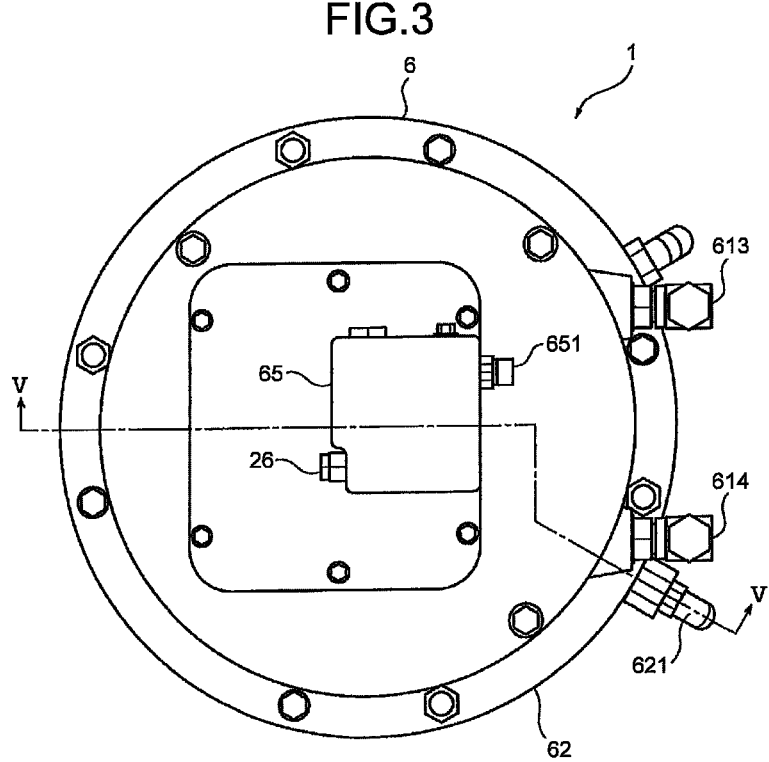
FIG. 3 is a plan view of the electric motor according to the embodiment.
Figure 4:
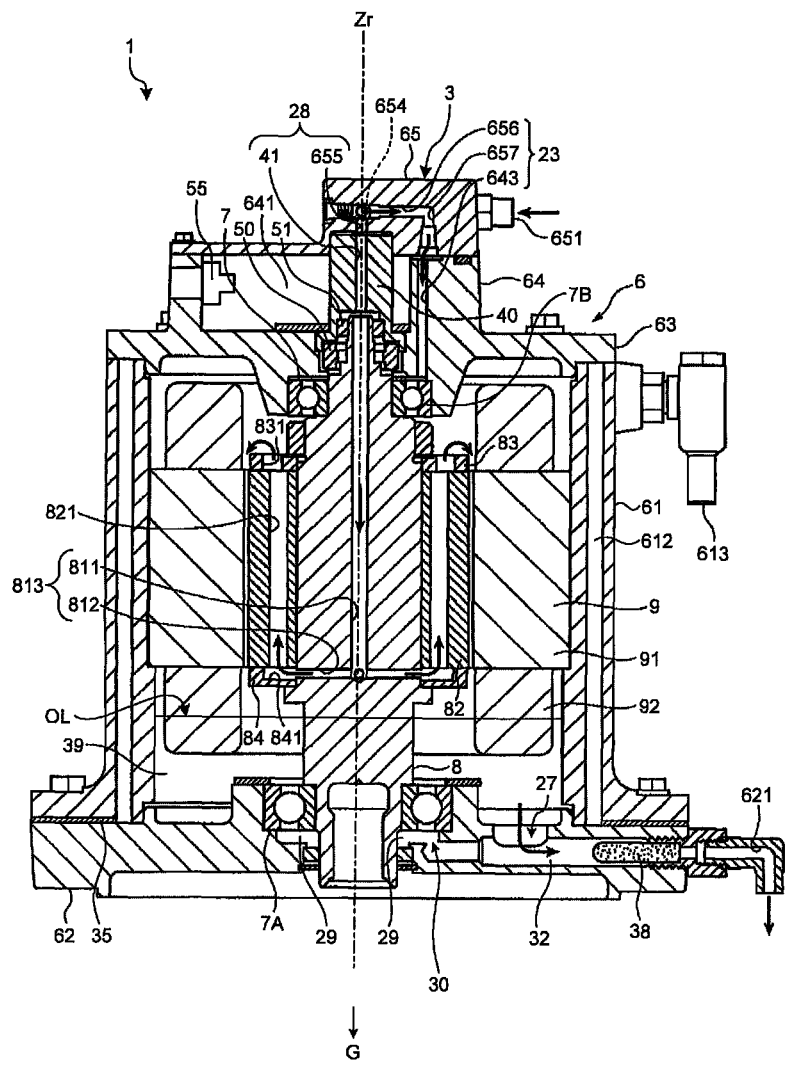
FIG. 4 is an arrow view along the line V-V of FIG. 3.
Figure 5:
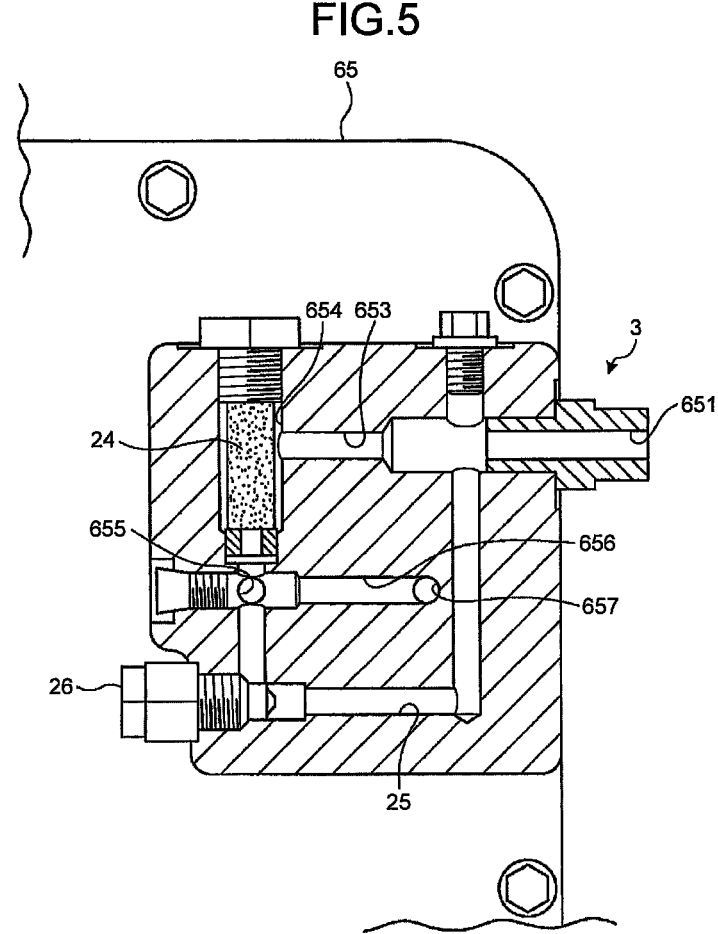
FIG. 5 is an arrow view along the line VI-VI of FIG. 2.

FIG. 2 is a front view illustrating the electric motor according to the embodiment. FIG. 3 is a plan view of the electric motor according to the embodiment. FIG. 4 is an arrow view along the line V-V of FIG. 3. FIG. 5 is an arrow view along the line VI-VI of FIG. 2. As illustrated in FIG. 2, the electric motor 1 includes a shaft 8 which serves as an input and output shaft in a cylindrical housing 6, a rotor core 82 which is attached to the shaft 8, and a stator 9 which is disposed in the outer periphery of the rotor core 82. That is, the electric motor 1 has a structure in which the shaft 8 attached with the rotor core 82 is disposed in the cylindrical housing 6. The shaft 8 has bearings 7A and 7B attached to both sides thereof and is rotatably supported by the housing 6 through the bearings 7A and 7B.

The housing 6 includes a housing body 61 which is a cylindrical member, a first flange 62 which is an end side member attached to one end of the housing body 61 (the input and output side end of the shaft 8), and a second flange 63 which is attached to the other end of the housing body 61 and has a disk shape. As described below, the second flange 63 includes a flange convex portion 64 and a cover 65, but the flange convex portion 64 and the cover 65 are also a part of the housing 6.

A space which is surrounded by the housing body 61, the first flange 62, and the second flange 63 becomes the inside of the housing 6. The first flange 62 is disposed at the lower side (which is the gravity action direction side and the direction side indicated by the arrow G in FIGS. 2 and 5) while the electric motor 1 is used. For example, when the electric motor 1 is mounted on the hybrid excavator 10 illustrated in FIG. 1, the state where the hybrid excavator 10 is grounded to the horizontal plane is set as the state where the electric motor 1 is used, and the first flange 62 is disposed at the lower side in this state.

The housing body 61 is a member of which the inner peripheral surface is cylindrical. The housing body 61 includes a cooling water introduction port 613 which introduces water for cooling the electric motor 1 into a water jacket 612 and a cooling water discharge port 614 which discharges the cooling water from the water jacket. Furthermore, a liquid other than water, for example, oil may be introduced into the water jacket 612 so as to cool the electric motor 1.

In the electric motor 1, the shaft 8, the stator 9, and the like are cooled by, for example, a cooling medium such as oil. The first flange 62 is a disk-like member. The first flange 62 includes a cooling medium discharge port 621 which discharges the cooling medium from the inside of the housing 6 and guides the cooling medium to a pump for suctioning and discharging the cooling medium during the operation of the electric motor 1. Further, the first flange 62 includes a drain port 622 which drains the cooling medium inside the housing 6 when maintaining and checking the electric motor 1. The first flange 62 is disposed at one end of the housing 6 and the shaft 8 passes therethrough. A power transmission joint or an input shaft of a decelerator is attached to the shaft 8 which passes through the first flange 62. In the embodiment, the first flange 62 is a member separated from the housing body 61, but the first flange 62 and the housing body 61 may be formed as the same member.

The second flange 63 is disposed at the upper side, that is, the opposite side to the gravity action direction while the electric motor 1 is used. The second flange 63 includes the flange convex portion 64 and the cover 65. The cover 65 includes a cooling medium inlet 651. The cooling medium inlet 651 is used to introduce the cooling medium discharged from the pump into the housing 6. Next, the internal structure of the electric motor 1 will be described.

<Electric Motor Internal Structure>

As illustrated in FIG. 4, the bearing 7A which is attached to one end side of the shaft 8 is attached to the first flange 62, and the bearing 7B which is attached to the other end side of the shaft 8 is attached to the second flange 63. With such a structure, the shaft 8 is rotatably supported by the housing 6 (more specifically, the housing body 61, the first flange 62, and the second flange 63) through two bearings 7A and 7B provided at both sides thereof, and rotates about the rotation center axis Zr. The rotation center axis Zr is the center axis of the shaft 8.

The rotor core 82 which is attached to the outer periphery of the shaft 8 has a structure in which a plurality of steel plates (electromagnetic steel plates) are stacked. The rotor core 82 is sandwiched by balance plates 83 and 84 from both sides of the direction (the stacking direction) in which the steel plates are stacked. The balance plates 83 and 84 are attached to the shaft 8 so that the plurality of steel plates constituting the rotor core 82 are not separated from each other, and hence a pressure is applied to the plurality of steel plates. The balance plate 84 near the first flange 62 is disposed at the side of the first flange 62, that is, the input and output side of the shaft 8 of the electric motor 1.

The stator 9 which is attached to the inner periphery of the housing body 61 of the housing 6 is disposed in the outer periphery of the rotor core 82. The stator 9 is a structure in which a coil 92 is wound around a stator core 91. The protruding portion of the coil 92 from the stator core 91 is a coil end. The stator core 91 is a structure in which a plurality of steel plates (electromagnetic steel plates) are stacked.

The shaft 8 includes an axial passageway 811 which extends along the rotation center axis Zr and a plurality of radial passageways 812 which extend outward in the radial direction of the shaft 8 from the axial passageway 811 and are opened to the surface of the shaft 8. The axial passageway 811 and the radial passageways 812 become a shaft inside cooling medium passageway 813 as an internal cooling medium passageway. The balance plate 84 includes a concave portion 841 at the contact side with the rotor core 82. The rotor core 82 includes a rotor core penetration hole 821 which penetrates the rotor core 82 in a direction in which a plurality of steel plates are stacked, that is, a direction parallel to the rotation center axis Zr of the shaft 8. Further, the rotor core 82 includes a plurality of permanent magnets (not illustrated). The balance plate 83 near the second flange 63 includes a balance plate penetration hole 831 which faces a direction parallel to the rotation center axis Zr of the shaft 8. The shaft inside cooling medium passageway 813, the concave portion 841, the rotor core penetration hole 821, and the balance plate penetration hole 831 respectively communicate with each other so as to become a passage where the cooling medium passes. These are provided in the shaft 8 and the rotor core 82 as rotation bodies, and become a rotation side cooling medium passageway where the cooling medium passes.

A resolver 50 which serves as a rotation angle detection sensor detecting a rotation angle of the shaft 8 is attached to the side circumference portion at one end side of the shaft 8, and more specifically, the end near the second flange 63. The axial passageway 811 is opened to the end near the second flange 63. That is, the resolver 50 is attached to the end where the axial passageway 811 is opened in the side circumference portion of the shaft 8.

The flange convex portion 64 of the second flange 63 includes a convex portion inside space 641. A resolver push 40 as a push member is provided in the convex portion inside space 641. The resolver push 40 has a function of supplying the cooling medium from a cooling medium supply portion 3 provided in the cover 65 as a stationary system to the shaft 8 as a rotary system and a function of pressing and fixing the resolver 50 as the rotation angle detection sensor to the flange convex portion 64 provided in the second flange 63. The resolver push 40 includes a cooling medium introduction passageway 41 which passes therethrough. The cooling medium introduction passageway 41 faces the opening of the axial passageway 811 of the shaft 8, and introduces the cooling medium to the axial passageway 811. Further, the flange convex portion 64 includes a bearing side passageway 643 which supplies the cooling medium to the bearing 7B. The cooling medium is supplied from the bearing side passageway 643 to the bearing 7B. Further, the flange convex portion 64 is attached with a connector 55 which holds a cable for extracting the output of the resolver 50.

The cover 65 is attached to the opening of the flange convex portion 64 and blocks the convex portion inside space 641 provided in the flange convex portion 64. Further, the cover 65 includes the cooling medium supply portion 3. More specifically, the cooling medium supply portion 3 is provided inside the cover 65 constituting the housing 6. Since the cover 65 is disposed at the upper side (the side opposite to the vertical direction), the cooling medium supply portion 3 is also disposed at the upper side. The cooling medium supply portion 3 includes a bearing passageway 23 and a rotor passageway 28 to be described later. The cooling medium supply portion 3 introduces the cooling medium from the cooling medium inlet 651 attached to the cover 65 as the stationary system and supplies the cooling medium to the shaft inside cooling medium passageway 813 provided in the shaft 8 as the rotary system through the rotor passageway 28. In this way, the cooling medium supply portion 3 supplies the cooling medium from the stationary system to the rotary system. Further, the cooling medium supply portion 3 also supplies the cooling medium introduced from the cooling medium inlet 651 to the bearing side passageway 643 provided in the flange convex portion 64 through the bearing passageway 23. The cooling medium which is supplied to the bearing side passageway 643 is supplied to the bearing 7B.

As illustrated in FIG. 5, the cover 65 which is attached to the flange convex portion 64 includes a first cooling medium distribution passageway 653, a second cooling medium distribution passageway 655, a third cooling medium distribution passageway 656, and a fourth cooling medium distribution passageway 657 which distribute the cooling medium from the cooling medium inlet 651. Further, the cover 65 includes a filter accommodation portion 654 which accommodates a filter 24, a relief passageway 25, and a relief valve 26. The cooling medium inlet 651 is connected to the filter accommodation portion 654 through the first cooling medium distribution passageway 653.

The second cooling medium distribution passageway 655 is connected to the filter accommodation portion 654 and introduces a part of the cooling medium passing the filter 24 to the cooling medium introduction passageway 41 of the resolver push 40. The second cooling medium distribution passageway 655 and the cooling medium introduction passageway 41 correspond to the rotor passageway 28. The third cooling medium distribution passageway 656 is connected to the filter accommodation portion 654 and introduces a rest of the cooling medium passing the filter 24 and introduced into the cooling medium introduction passageway 41 into the fourth cooling medium distribution passageway 657. The third cooling medium distribution passageway 656, the fourth cooling medium distribution passageway 657, and the bearing side passageway 643 correspond to the bearing passageway 23.

The relief passageway 25 connects the cooling medium inlet 651 to the relief valve 26. The relief valve 26 is interposed between the relief passageway 25, the second cooling medium distribution passageway 655, and the third cooling medium distribution passageway 656 so as to bypass the filter 24. When the pressure of the cooling medium in the relief passageway 25 exceeds the valve opening pressure of the relief valve 26, the relief valve 26 is opened, so that the cooling medium from the cooling medium inlet 651 flows to the second cooling medium distribution passageway 655 and the third cooling medium distribution passageway 656 while bypassing the filter 24. The valve opening pressure of the relief valve 26 may be set to, for example, the pressure in the relief passageway 25 when the filter 24 needs to be replaced due to the blocking thereof. With such a configuration, it is possible to reliably supply the cooling medium to the bearing 7B, the rotor core 82, and the like even when the filter 24 needs to be replaced due to the blocking thereof. Further, when the valve opening pressure of the relief valve 26 is set as described above and a unit for informing the opened state of the relief valve 26 is prepared, it is possible to inform the replacement timing of the filter 24 by the opening of the relief valve 26.

In the embodiment, in the plurality of cooling medium passageways provided in the cover 65, the passageways which are perpendicular to the rotation center axis Zr of the electric motor 1 are arranged on the same plane. In this case, the center axes of the respective passageways are arranged in the same plane. More specifically, the first cooling medium distribution passageway 653, the filter accommodation portion 654, the third cooling medium distribution passageway 656, the relief passageway 25, the passageway connecting the relief valve 26 to the relief passageway, the first cooling medium distribution passageway 653, and the passageway connecting the cooling medium inlet 651 to the filter accommodation portion 654 illustrated in FIG. 5 are arranged so that the respective center axes are arranged in the same plane.

The passageway inside the cover 65 perpendicular to the rotation center axis Zr of the electric motor 1 is formed by perforating, for example, the cover 65 in the horizontal direction, but when the passageway is disposed as described above, it is possible to easily select the efficient procedure and to efficiently perform the processing when processing the passageway in the cover 65. That is, when forming a plurality of passageways inside the cover 65 so as to be perpendicular to the rotation center axis Zr of the electric motor 1, it is possible to perforate a plurality of positions of the cover 65 in the horizontal direction by setting the height from the reference surface to the tool to be constant and hence to minimize the chance of changing the height of the tool during the perforating operation. As a result, since it is possible to decrease the operation time and the tool setting effort when forming a plurality of passageways perpendicular to the rotation center axis Zr of the electric motor 1 in the cover 65, it is possible to improve the productivity and to decrease the manufacture cost.

Since the flange convex portion 64, that is, the stationary system is provided with the bearing passageway 23, the supply of the cooling medium is not influenced by the rotation of the rotor core 82. For this reason, it is possible to suppress a change in the cooling medium with the rotation of the rotor core 82 compared to the case where the passageway is formed in the bearing 7B from the shaft 8. As a result, it is possible to supply an appropriate amount of the cooling medium to the bearing 7B. Next, the cooling structure provided in the electric motor 1 will be described.

<Electric Motor Cooling Structure>

Figure 6:
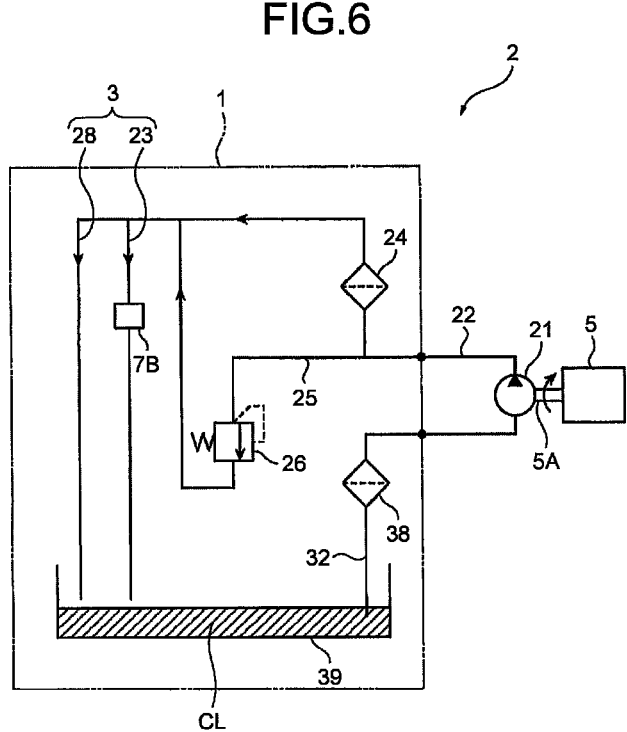
FIG. 6 is a schematic diagram illustrating an electric motor cooling structure according to the embodiment.

FIG. 6 is a schematic diagram illustrating the electric motor cooling structure according to the embodiment. As described above, in the electric motor 1, the shaft 8, the stator 9, and the like are cooled by the cooling medium CL and the bearing 7B is lubricated by the cooling medium CL. A cooling structure 2 of the electric motor 1 includes a pump 21, a pump electric motor 5, a passageway 22, the bearing passageway 23, the rotor passageway 28, an oil accumulation portion 39, a discharge passageway 32, the filter 24, the relief passageway 25, the relief valve 26, and a filter 38. A cooling unit which cools the cooling medium CL may be provided between the filter 38 and the pump 21. The pump 21 and the pump electric motor 5 are connected to each other by an input and output shaft 5A of the pump electric motor 5. A driving unit of the pump 21 may not be the pump electric motor 5 and, for example, an internal combustion engine as a power generating source of the hybrid excavator 10 illustrated in FIG. 1 may be used. In the embodiment, the filter 24 and the filter 38 are built in the electric motor 1.

When cooling the electric motor 1, the pump electric motor 5 drives the pump 21. Then, the pump 21 suctions the cooling medium CL from the discharge passageway 32, and discharges the cooling medium to the passageway 22. The cooling medium CL passes the filter 24 while foreign material and the like are removed therefrom, and flows into the bearing passageway 23 and the rotor passageway 28. The cooling medium CL which flows into the bearing passageway 23 cools and lubricates the bearing 7B, and is accumulated in the oil accumulation portion 39. The cooling medium CL which flows into the rotor passageway 28 cools the rotor core and the coil of the electric motor 1, and is accumulated in the oil accumulation portion 39. The oil accumulation portion 39 and the suction port of the pump 21 are connected to each other by the discharge passageway 32 having the filter 38 provided therein. The cooling medium CL which is accumulated in the oil accumulation portion 39 passes the discharge passageway 32, passes the filter 38 so that the foreign material is removed therefrom, is suctioned to the pump 21 again, and is discharged to the passageway 22.

The passageway 22 is connected to the discharge port of the pump 21, and is branched to the inlet side of the filter 24 and the relief passageway 25 inside the electric motor 1. The passageway which is provided at the outlet side of the filter 24 so that the cooling medium passes therethrough is branched to the bearing passageway 23 and the rotor passageway 28. The bearing passageway 23 supplies the cooling medium to the bearing 7B so as to cool and lubricate the bearing. The rotor passageway 28 supplies the cooling medium to the rotor of the electric motor 1 so as to cool the rotor. Furthermore, the cooling structure 2 may not essentially include the bearing passageway 23. The relief passageway 25 which is branched from the passageway 22 connected to the discharge port of the pump 21 is connected to the inlet of the relief valve 26. The outlet side of the relief valve 26 is connected to the outlet side of the filter 24.

In the cooling structure 2, for example, when the cooling medium hardly flows to the filter 24 due to the blocking of the filter 24, the pressure of the passageway 22 and the relief passageway 25 increases. When the pressure of the cooling medium in the relief passageway 25 exceeds the valve opening pressure of the relief valve 26, the relief valve 26 is opened. Then, the relief valve 26 causes the cooling medium to flow to the bearing passageway 23 and the rotor passageway 28 by bypassing the filter 24. In this way, even when the filter 24 is blocked, the cooling structure 2 may cause the cooling medium to flow from the relief valve 26 to the bearing passageway 23 and the rotor passageway 28 so that the bearing 7B is cooled and lubricated and the rotor core and the like are cooled. Next, the flow of the cooling medium when cooling the electric motor 1 will be described.

<Flow of Cooling Medium at Cooling Operation>

A part of the cooling medium which is supplied from the cooling medium inlet 651 of the cover 65 and passes the filter 24 passes the rotor passageway 28, and flows into the axial passageway 811 of the shaft inside cooling medium passageway 813. The cooling medium passes the radial passageway 812 and flows into the rotor core penetration hole 821 through the concave portion 841 of the balance plate 84. The cooling medium cools the rotor core 82 and the permanent magnet (not illustrated) while passing the rotor core penetration hole 821, and flows out of the balance plate penetration hole 831 of the balance plate 83. When the rotor core 82 rotates, the cooling medium which flows out of the balance plate penetration hole 831 is supplied to the coil end of the stator 9 (the protruding portion of the coil 92 from the stator core 91) by the centrifugal force. The cooling medium cools the stator 9 while flowing downward inside the housing 6, and is accumulated in a first discharge port 27 provided in the housing 6 of the first flange 62. The reference sign OL of FIG. 4 indicates the liquid level of the cooling medium which is accumulated in the oil accumulation portion 39. In this way, as illustrated in FIG. 4, as for the amount of the cooling medium which is accumulated in the oil accumulation portion 39, the amount of the cooling medium which is discharged from the cooling medium discharge port 621 is adjusted so that a part of the coil end protruding toward the first flange is normally immersed into the cooling medium, whereby the coil end is cooled.

In the cooling medium which is supplied from the cooling medium inlet 651 of the cover 65 and passes the filter 24, the cooling medium which does not flow into the rotor passageway 28 flows into the bearing passageway 23 and is supplied to the bearing 7B. The cooling medium flows downward inside the housing 6 after cooling and lubricating the bearing 7B. During this process, the cooling medium contacts the rotor core 82 and the permanent magnet (not illustrated) so as to cool them. A part of the cooling medium which contacts the rotor core 82 is supplied to the stator 9 at the outside of the rotor core 82 in the radial direction by the centrifugal force so as to cool the stator. The cooling medium which cools the stator 9 flows downward inside the housing 6, and is accumulated in the oil accumulation portion 39 provided inside the housing 6 of the first flange 62.

The cooling medium which is accumulated in the oil accumulation portion 39 mainly flows through the first discharge port 27 so as to flow into the discharge passageway 32, is guided to the filter 38 so as to remove the foreign material and the like therefrom, and is discharged from the cooling medium discharge port 621 provided in the first flange 62. The cooling medium of the oil accumulation portion 39 which does not pass the first discharge port 27 passes a space between the inner and outer races of the bearing 7A and the rolling element, flows into a bearing outside space 29, and passes a second discharge port 30. As a result, the cooling medium which is accumulated in the oil accumulation portion 39 cools and lubricates the bearing 7A. The cooling medium which passes the second discharge port 30 flows into the discharge passageway 32, is guided to the filter 38 so as to remove the foreign material and the like therefrom, and is discharged from the cooling medium discharge port 621 provided in the first flange 62.

In this way, the cooling medium cools the rotor core 82 and the stator 9 and cools and lubricates the bearings 7A and 7B. In addition, as described above, the cooling water is supplied from the cooling water introduction port 613 to the water jacket 612 provided in the housing body 61 of the housing 6. The cooling water mainly cools the stator 9 through the housing 6. A gasket 35 as a sealing member for sealing the water jacket 612 is provided between the first flange 62 and the housing body 61. The gasket 35 also serves as an oil seal which prevents a problem in which the cooling medium in the housing 6 flows outward from a gap between the housing body 61 and the first flange 62 so as to be mixed with the substance of the water jacket 612 or flow to the outside of the housing 6. Next, the rotation angle detection sensor holding structure which is provided between the flange convex portion 64 and the cover 65 of the housing 6 provided in the electric motor 1 will be described.

<Rotation Angle Detection Sensor Holding Structure>

Figure 7:
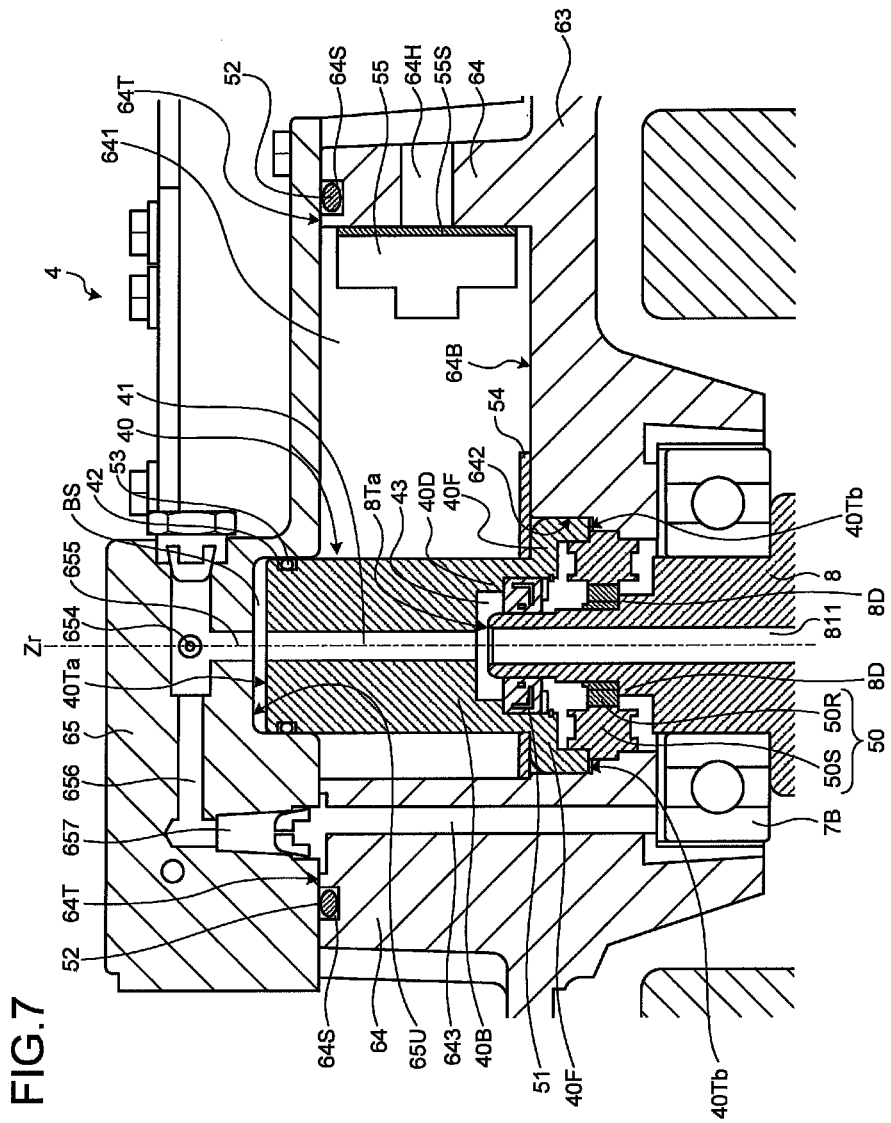
FIG. 7 is an enlarged cross-sectional view illustrating a rotation angle detection sensor holding structure according to the embodiment.
Figure 8:
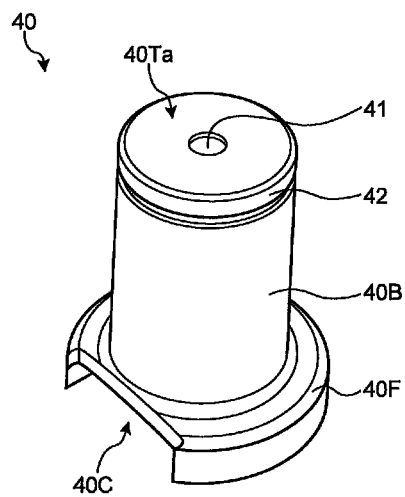
FIG. 8 is a perspective view of a resolver push.
Figure 9:
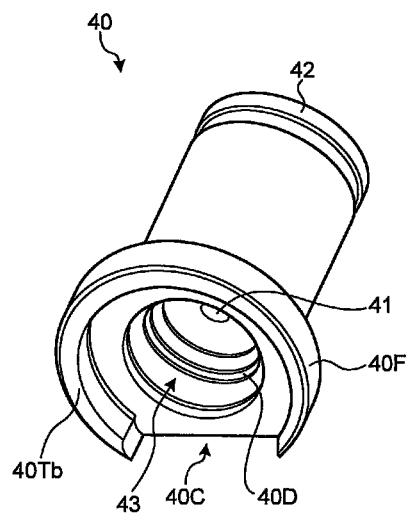
FIG. 9 is a perspective view of the resolver push.
Figure 10:
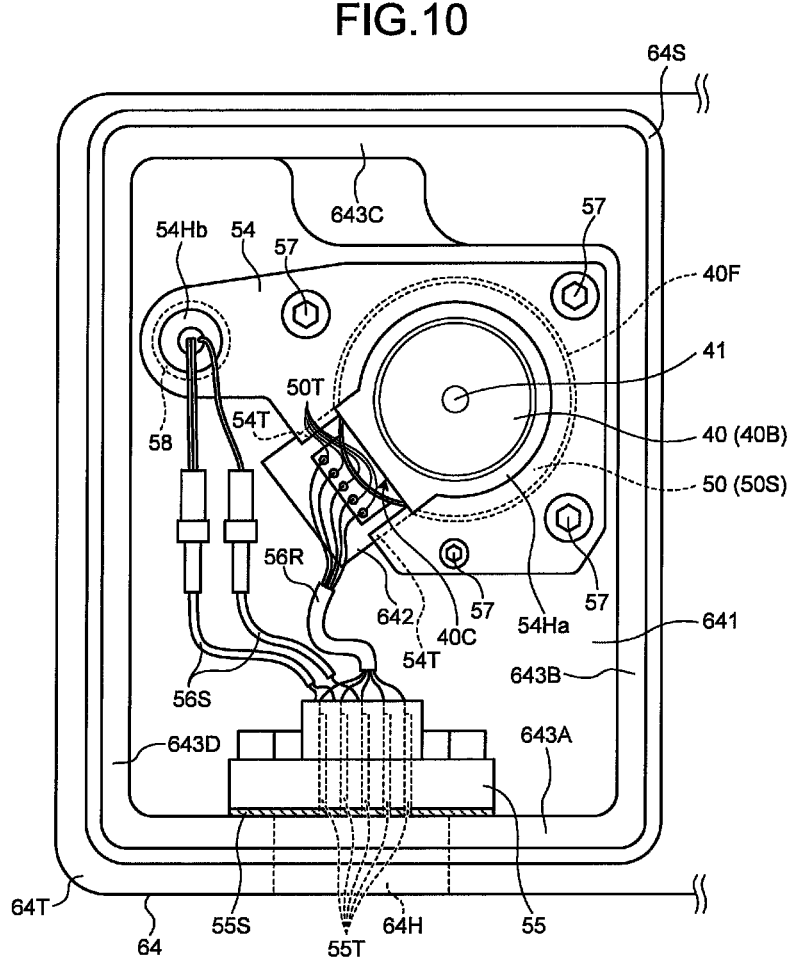
FIG. 10 is a plan view illustrating an inside of a convex portion of a housing provided in the electric motor according to the embodiment.
Figure 11:
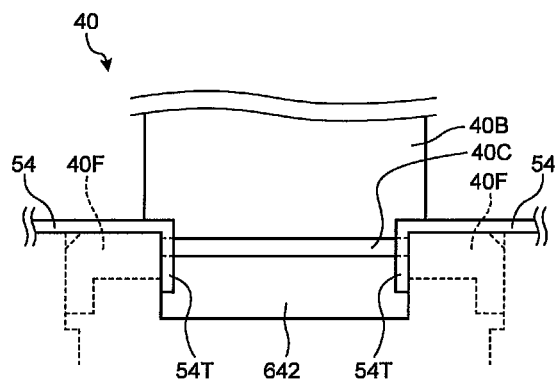
FIG. 11 is a diagram illustrating a structure in which the resolver push is fixed to the concave portion (the rotation angle detection sensor holding portion).
Figure 12:
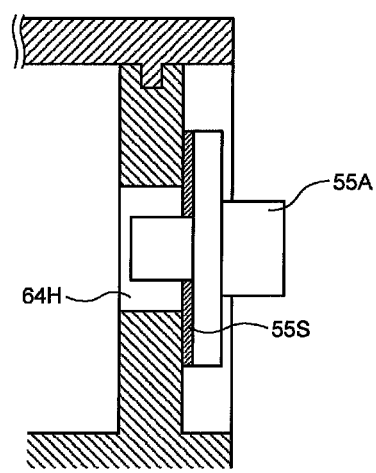
FIG. 12 is a diagram illustrating another example when attaching a connector to a flange convex portion.

FIG. 7 is an enlarged cross-sectional view illustrating the rotation angle detection sensor holding structure according to the embodiment. FIGS. 8 and 9 are perspective views of the resolver push. FIG. 10 is a plan view illustrating the inside of the convex portion of the housing provided in the electric motor according to the embodiment. FIG. 11 is a diagram illustrating a structure in which the resolver push is fixed to the concave portion (the rotation angle detection sensor holding portion). FIG. 12 is a diagram illustrating another example when attaching the connector to the flange convex portion. The resolver 50 includes a resolver rotor 50R which is attached to the shaft 8 as the rotary system and a resolver stator 50S which is attached to the second flange 63 as the stationary system. The resolver rotor 50R rotates along with the shaft 8. Accordingly, the resolver rotor 50R rotates about the rotation center axis Zr of the shaft 8.

The resolver stator 50S of the resolver 50 is fitted to a rotation angle detection sensor holding portion 642 as the concave portion provided in the second flange 63. The shaft 8 attached with the resolver rotor 50R includes a step 8D of which the outer diameter is larger than the inner diameter of the resolver rotor 50R, and the resolver rotor 50R is locked by the step 8D. With such a structure, the resolver rotor 50R is disposed at a position where the resolver rotor faces the resolver stator 50S. The resolver 50 is pressed against the second flange 63 by the resolver push 40 from one end of the shaft 8 (an end surface 8Ta where the axial passageway 811 is opened). The resolver push 40 is fixed to the second flange 63 by a fixation member 54 as the plate member. In this way, the resolver 50 (more specifically the resolver stator 50S) is fixed to the second flange 63. Furthermore, the fixation member 54 may be formed by punching and bending, for example, a metal plate.

As illustrated in FIGS. 7 to 9, the resolver push 40 includes a columnar body 40B and a projecting portion 40F which is provided in one end of the body 40B and protrudes outward in the radial direction of the body 40B. Further, the body 40B includes a groove 42 which is provided at the other end side, that is, the opposite side to the end provided with the projecting portion 40F so as to extend in the circumferential direction. As illustrated in FIG. 7, the groove 42 is provided with an O-ring 53 as a seal member. The resolver push 40 is formed by, for example, aluminum alloy. Since the resolver push 40 is a member separated from the cover 65, the resolver push may be formed of a material different from that of the cover 65. With such a configuration, an appropriate material may be used in the resolver push 40 and the precision of the resolver push 40 may be improved.

In the rotation angle detection sensor holding structure (a resolver holding structure) 4, one end surface of the resolver push 40, that is, an end surface 40Tb near the projecting portion 40F contacts the resolver stator 50S of the resolver 50. Further, the other end surface of the resolver push 40, that is, an end surface 40Ta near the groove 42 is fitted to a concave portion 65U provided in the cover 65 so as to face the concave portion 65U. Furthermore, the cover 65 is a portion which is provided with the cooling medium supply portion 3 illustrated in FIG. 4 in the housing 6. The cooling medium introduction passageway 41 penetrates the resolver push 40 from the end surface 40Ta of the body 40B toward the projecting portion 40F.

As illustrated in FIGS. 7 and 9, the resolver push 40 includes a concave portion 43 near the projecting portion 40F. The concave portion 43 has a circular shape in the plan view, where the inner diameter of the end surface 40Ta near the groove 42 is the smallest and the inner diameter of the end surface 40Tb of the projecting portion 40F is large. The portion of which the inner diameter of the concave portion 43 changes becomes a step 40D. As illustrated in FIG. 7, the portion in which the shaft 8 protrudes from the resolver rotor 50R of the resolver 50 is inserted into the concave portion 43. An oil seal 51 as a seal member is provided between the shaft 8 and the concave portion 43 of the resolver push 40. The oil seal 51 which is provided in the concave portion 43 is locked to the step 40D.

The projecting portion 40F of the resolver push 40 includes a notched portion 40C in which a part of a circle is cut by one string when seen from the direction parallel to the penetration direction of the cooling medium introduction passageway 41. As illustrated in FIGS. 10 and 11, the notched portion 40C which is provided in the projecting portion 40F engages with a rotation fixing portion 54T of the fixation member 54 interfolded toward the rotation angle detection sensor holding portion 642 so as to suppress the rotation of the resolver push 40 about the rotation center axis Zr. Furthermore, FIG. 11 illustrates a state where the resolver push 40, the fixation member 54, and the rotation angle detection sensor holding portion 642 are seen from the notched portion 40C of the resolver push 40.

The flange convex portion 64 is a portion which protrudes from the second flange 63 and has the convex portion inside space 641 therein. As illustrated in FIG. 10, the convex portion inside space 641 is a space which is surrounded by four walls 643A, 643B, 643C, and 643D protruding from the second flange 63 illustrated in FIG. 7, and the opening is closed by the cover 65. The cover 65 contacts the end surface (a convex portion end surface) 64T of the flange convex portion 64 at the end surfaces of four walls 643A, 643B, 643C, and 643D, that is, the opening side of the convex portion inside space 641. As illustrated in FIGS. 7 and 10, the convex portion end surface 64T includes a groove 64S which extends in the entire circumference of four walls 643A, 643B, 643C, and 643D so as to surround the opening of the convex portion inside space 641. As illustrated in FIG. 7, an O-ring 52 as a seal member is attached to the groove 64S. When the cover 65 is attached to the flange convex portion 64, the O-ring 52 seals the convex portion inside space 641.

The resolver push 40 is disposed in the convex portion inside space 641 and is interposed between the cover 65 and the second flange 63, and more specifically, the concave portion 65U of the cover 65 and the rotation angle detection sensor holding portion 642 of the flange convex portion 64. When the resolver push 40 is attached to the rotation angle detection sensor holding portion 642 and the resolver 50 is pressed so as to be fixed to the second flange 63, the end surface 40Ta at the other end surface, that is, the groove 42 protrudes toward the outside of the convex portion inside space 641 in relation to the convex portion end surface 64T of the flange convex portion 64. The protruding resolver push 40 is fitted to the concave portion 65U of the cover 65. The depth of the concave portion 65U is larger than the dimension from the convex portion end surface 64T to the end surface 40Ta near the groove 42. For this reason, a space BS is formed between the end surface 40Ta near the groove 42 of the resolver push 40 fitted to the concave portion 65U and the concave portion 65U facing the end surface. For example, when the resolver push 40 is extended by an increase in temperature, the space BS avoids the contact with the resolver 50 and the cover 65.

After the resolver push 40 is pressed against the resolver 50, as illustrated in FIG. 10, the fixation member 54 is fixed to the second flange 63 illustrated in FIG. 7 by a bolt 57 through the resolver push 40 (more specifically, the body 40B of the resolver push 40) in the first opening 54Ha of the fixation member 54. With such a configuration, the resolver 50 (more specifically, the resolver stator 50S) is fixed to the second flange 63 through the resolver push 40 and the fixation member 54. When the cover 65 is attached to the flange convex portion 64, the end surface 40Ta of the resolver push 40 is fitted to the concave portion 65U of the cover 65. However, since the space BS is interposed between the concave portion 65U and the resolver push 40, it is possible to prevent a force from being applied from the cover 65 to the resolver 50 through the resolver push 40.

In the embodiment, the resolver holding structure 4 does not use the cover 65, but uses the resolver push 40 and the fixation member 54 so as to fix and hold the resolver 50 at the second flange 63. That is, the resolver holding structure 4 separates a function (resolver holding function) of pressing and holding the resolver 50 from the cover 65 so that the resolver holding function is provided in the resolver push 40 and the fixation member 54. Then, the resolver holding structure 4 provides a function (convex portion space sealing function) of sealing the convex portion inside space 641 in the cover 65. When one member (for example, the cover 65) has the resolver holding function and the convex portion space sealing function, it is difficult to realize both functions if the positional precision of the member and the resolver 50 and the positional precision of the member and the convex portion end surface 64T are not improved. That is, when the precisions of two positions at one member are not improved, both functions are not easily realized. However, since the resolver holding structure 4 provides the resolver holding function and the convex portion space sealing function in different members, one member may not have both functions. As a result, there is no need to improve the precisions of two positions in one member. That is, since it is possible to suppress the precision which is needed for the member that fixes the resolver 50 as the rotation angle detection sensor and seals the space provided with the resolver 50, there is an advantage that the manufacture is easily performed.

In the concave portion 65U of the cover 65, the second cooling medium distribution passageway 655 as a part of the cooling medium supply portion 3 (see FIG. 4) is opened. The opening of the second cooling medium distribution passageway 655 faces the opening near the end surface 40Ta of the cooling medium introduction passageway 41 provided in the resolver push 40 fitted to the concave portion 65U. The opening near the projecting portion 40F of the cooling medium introduction passageway 41 faces the opening of the axial passageway 811 at the end surface 8Ta of the shaft 8. Since the O-ring 53 is interposed between the concave portion 65U of the cover 65 and the resolver push 40, it is possible to prevent the leakage of the cooling medium therebetween. Further, since the oil seal 51 is interposed between the resolver push 40 and the shaft 8, it is possible to prevent the leakage of the cooling medium therebetween.

With such a structure, the resolver holding structure 4 may supply the cooling medium which is supplied from the second cooling medium distribution passageway 655 to the axial passageway 811 of the shaft 8 through the cooling medium introduction passageway 41 of the resolver push 40. Since the resolver push 40 is provided in the stationary system and the shaft 8 is provided in the rotary system, the resolver holding structure 4 may supply the cooling medium from the stationary system to the rotary system.

Further, in the embodiment, the cover 65 which includes the cooling medium supply portion 3 (see FIG. 4) with the second cooling medium distribution passageway 655 and the resolver push 40 with the cooling medium introduction passageway 41 are provided as separate members. With such a structure, when a problem in which the foreign material enters the cooling medium supply portion 3 or the cooling medium introduction passageway 41 arises, it is possible to easily clean the cooling medium supply portion 3 or the cooling medium introduction passageway 41 by separating the cover 65 and the resolver push 40. In this way, since it is possible to separate the cooling medium passageway into short units by providing the cover 65 and the resolver push 40 as separate members, there is an advantage that the maintenance of the cooling medium passageway may be easily performed.

In the embodiment, when the inner diameter of the second cooling medium distribution passageway 655 is denoted by D1, the inner diameter of the cooling medium introduction passageway 41 is denoted by D2, and the inner diameter of the axial passageway 811 is denoted by D3, a relation of D1=D2<D3 is established, but this relation is not limited to the above-described relation. For example, when the inner diameter D2 of the cooling medium introduction passageway 41 is set to be smaller than the inner diameter D1 of the second cooling medium distribution passageway 655, it is possible to suppress the amount of the cooling medium supplied to the axial passageway 811. Further, the cooling medium introduction passageway 41 may be formed by perforating using, for example, a drill. For this reason, since the same resolver push 40 is used in the plurality of electric machines having different specifications and the perforating is performed so that only the inner diameter D2 of the cooling medium introduction passageway 41 is different, it is possible to adjust the amount of the cooling medium supplied to the shaft 8. With such a configuration, the constituents may be commonly used.

The space BS which is formed between the concave portion 65U of the cover 65 and the resolver push 40 has a function of accumulating and holding the cooling medium supplied from the second cooling medium distribution passageway 655. For this reason, even when any problem arises in the cooling medium supply system so that the supply of the cooling medium from the second cooling medium distribution passageway 655 is temporarily stopped, the cooling medium which is accumulated in the space BS is supplied to the axial passageway 811 of the shaft 8, and hence the rotor and the stator of the electric motor 1 may be continuously cooled. In the embodiment, the opening of the second cooling medium distribution passageway 655 faces the opening of the cooling medium introduction passageway 41, but when both openings are arranged in an offset state (in a state where both openings slightly overlap each other or do not overlap each other), the cooling medium which flows out of the second cooling medium distribution passageway 655 collides with the end surface 40Ta of the resolver push 40 and flows into the cooling medium introduction passageway 41. With such a configuration, since it is possible to extend the time for which the cooling medium which flows out of the second cooling medium distribution passageway 655 stays in the space BS, it is possible to further efficiently accumulate the cooling medium in the space BS.

As illustrated in FIG. 10, the resolver 50 includes a plurality of terminals (resolver terminals) 50T. The plurality of resolver terminals 50T are used to supply an excitation signal to the resolver 50 or extract the rotation angle of the shaft 8 detected by the resolver 50. The plurality of resolver terminals 50T are electrically connected to terminals (connector terminals) 55T provided in the connector 55 so as to be held therein through a signal cable. That is, the signal cable 56 is used to extract the output of the resolver 50, where one end is electrically connected to the connector terminal 55T and the other end is electrically connected to the resolver terminal 50T. Furthermore, the signal cable 56 has a function of supplying an excitation signal to the resolver 50. The connector 55 is also connected to a signal cable 56S which is connected to various sensors for detecting the state of the electric motor 1, where the sensors include a temperature sensor which detects the temperature inside the electric motor 1, a sensor which detects the contact state of the power cable supplying power to the coil 92 of the stator 9, and the like.

The flange convex portion 64 includes a connector attachment hole 64H for attaching the connector 55 thereto. In the embodiment, the connector attachment hole 64H is provided in the wall 643A illustrated in FIG. 10. The connector 55 is attached to the connector attachment hole 64H with a seal member 55S interposed therebetween from the convex portion inside space 641 of the flange convex portion 64. Further, as illustrated in FIG. 12, the connector 55 may be attached to the connector attachment hole 64H with the seal member 55S interposed therebetween from the outside of the convex portion inside space 641. Since the flange convex portion 64 is a part of the housing 6, the connector 55 is attached to the housing 6. An external connector which is electrically connected to the connector terminal 55T of the connector 55 and is connected to the control device of the electric motor 1 is connected to the connector 55 which appears from the connector attachment hole 64H. With such a configuration, the control device may perform the output of the resolver 50 and the excitation of the resolver 50.

In the embodiment, in the convex portion inside space 641 of the flange convex portion 64, the size (the convex portion space height) between a convex portion inside space bottom portion 64B (the surface near the cover 65 of the second flange 63) and the cover 65 is set to a sufficient size for attaching the connector 55. With such a configuration, in the embodiment, the connector 55 may be attached to the wall 643A of the flange convex portion 64 and at least a part of the connector 55 may be disposed in the convex portion inside space 641. Further, the signal cable 56 which electrically connects the connector terminal 55T to the resolver terminal 50T may be accommodated in the convex portion inside space 641.

When connecting the resolver terminal 50T to the connector terminal 55T through the signal cable 56 and sealing the convex portion inside space 641 by the cover 65, the following methods are supposed in the embodiment.

(1) The resolver unit is prepared in which the connector terminal 55T is held by the connector 55 while the connector terminal 55T is electrically connected to one end of the signal cable 56 and the resolver terminal 50T is electrically connected to the other end thereof. Next, the resolver 50 is attached and fixed to the flange convex portion 64, and the connector 55 is attached to the connector attachment hole 64H of the flange convex portion 64 with the seal member 55S interposed therebetween. Subsequently, the cover 65 is attached to the flange convex portion 64 and the convex portion inside space 641 is sealed.

(2) The connector 55 which holds the connector terminal 55T electrically connected to the signal cable 56 is prepared. Next, the opposite end to the connector terminal 55T of the signal cable 56 is electrically connected to the resolver terminal 50T of the resolver 50 attached to the flange convex portion 64 by, for example, soldering or the like. Next, the connector 55 is attached to the connector attachment hole 64H of the flange convex portion 64 with the seal member 55S interposed therebetween from the inside of the convex portion inside space 641. Subsequently, the cover 65 is attached to the flange convex portion 64 and the convex portion inside space 641 is sealed.

(3) The connector 55 is prepared which holds the connector terminal 55T electrically connected to the signal cable 56. Next, the connector 55 is attached to the connector attachment hole 64H of the flange convex portion 64 with the seal member 55S interposed therebetween. In this case, the connector 55 is attached from the inside of the convex portion inside space 641. Next, the opposite end to the connector terminal 55T of the signal cable 56 is electrically connected to the resolver terminal 50T of the resolver 50 attached to the flange convex portion 64 by, for example, soldering or the like. Subsequently, the cover 65 is attached to the flange convex portion 64 and the convex portion inside space 641 is sealed.

(4) The connector 55 is prepared which holds the connector terminal 55T electrically connected to the signal cable 56. Next, the connector 55 is attached to the connector attachment hole 64H of the flange convex portion 64 with the seal member 55S interposed therebetween from the outside of the convex portion inside space 641. In this case, the signal cable 56 passes through the connector attachment hole 64H and the connector 55 is attached to the connector attachment hole 64H. Next, the opposite end to the connector terminal 55T of the signal cable 56 is electrically connected to the resolver terminal 50T of the resolver 50 attached to the flange convex portion 64 by, for example, soldering or the like. Subsequently, the cover 65 is attached to the flange convex portion 64 and the convex portion inside space 641 is sealed.

In the method (1), the resolver unit is prepared in which the resolver 50, the connector 55, and the signal cable 56 are connected to each other, the resolver 50 of the resolver unit is attached to a predetermined position of the convex portion inside space 641 so as to be fixed to the second flange 63, and the connector 55 is attached to the connector attachment hole 64H. For this reason, since there is no need to perform soldering in the convex portion inside space 641, the operation efficiency is improved. Further, in the method (1), there is no need to make an effort of causing the signal cable 56 to pass through the cover 65 or the flange convex portion 64.

Further, in the method (1), it is possible to maintain the air-tightness of the convex portion inside space 641 by the seal member 55S interposed between the flange convex portion 64 and the connector 55. For this reason, in the method (1), there is no need to perform a mold resin enclosing operation for the waterproof of the signal cable 56 and the cover 65 or the flange convex portion 64 necessary for the case where the signal cable 56 passes through the cover 65 or the flange convex portion 64. Accordingly, it is possible to shorten a time for which the mold resin is solidified. As a result, in the method (1), since it is possible to simplify an operation of extracting the signal cable 56 extracting the output from the resolver to the outside of the housing 6 in the electric motor 1 in which the resolver 50 as the rotation angle detection sensor is provided inside the housing 6, it is possible to improve the operation efficiency and the productivity.

In the methods (2) and (3), there is a need to perform an operation of electrically connecting the resolver terminal 50T to the signal cable 56 by the convex portion inside space 641 compared to the method (1), the same advantages as those of the method (1) may be obtained except for the difference. Further, in the method (4), there is a need to perform an operation of causing the signal cable 56 to pass through the connector attachment hole 64H and an operation of electrically connecting the resolver terminal 50T to the signal cable 56 by the convex portion inside space 641 compared to the method (1), but the same advantages as those of the method (1) may be obtained except for the difference.

In this way, in the embodiment, the electric motor 1 illustrated in FIGS. 2, 4, and the like may attach the connector 55 to the flange convex portion 64 by increasing the convex portion space height in the convex portion inside space 641 of the flange convex portion 64, it is possible to improve the operation efficiency when connecting the resolver terminal 50T to the connector terminal 55T by the signal cable 56 and sealing the convex portion inside space 641 by the cover 65. However, since the convex portion space height of the flange convex portion 64 constituting the housing 6 increases in the electric motor 1, the distance from the second cooling medium distribution passageway 655 to the axial passageway 811 provided in the shaft 8 increases. For this reason, the electric motor 1 interposes the resolver push 40 between the opening of the second cooling medium distribution passageway 655 provided in the cover 65 and the opening of the axial passageway 811 near the end surface 8Ta of the shaft 8 and supplies the cooling medium from the second cooling medium distribution passageway 655 to the axial passageway 811 through the cooling medium introduction passageway 41 of the resolver push 40. With such a configuration, since there is no need to extend the shaft 8, there is no need to change the design of the existing shaft 8.

In this way, the resolver push 40 also has a function of supplying the cooling medium from the second cooling medium distribution passageway 655 to the axial passageway 811 other than the above-described resolver holding function. The resolver 50 protrudes the end surface 40Ta from the convex portion end surface 64T of the flange convex portion 64 so as to be fitted to the concave portion 65U of the cover 65. With such a configuration, since it is possible to perform the positioning operation when attaching the cover 65 to the flange convex portion 64, the operation efficiency is improved.

As illustrated in FIG. 10, the fixation member 54 includes a second opening 54Hb other than the first opening 54Ha. The signal cable 56S appears from the second opening 54Hb. The signal cable 56S passes through a grommet 58 provided at the bottom portion of the convex portion inside space 641. However, the fixation member 54 fixes the grommet 58 to the bottom portion of the convex portion inside space 641 by setting the inner diameter of the second opening 54Hb to be smaller than the outer diameter of the grommet 58.

The connector attachment hole 64H is provided in the wall 643A of the flange convex portion 64, but the space for providing the connector attachment hole 64H is not limited to the wall 643A. Further, in the embodiment, the connector terminal 55T is drawn in a direction perpendicular to the rotation center axis Zr of the shaft 8. With such a configuration, since the water from the cover 65 and the water from the first flange 62 may not intrude into the connector 55 when the directions are not changed by 90°, it is possible to suppress the intrusion of the water into the connector 55 by the arrangement of the connector 55 and hence to suppress degradation in the reliability. In particular, when the electric motor 1 is used so as to rotationally drive the upper swing body of the construction motor, the electric motor 1 may be vertically placed. However, it is possible to effectively suppress the intrusion of the water into the connector 55 by drawing the connector terminal 55T in a direction perpendicular to the rotation center axis Zr of the shaft 8. Furthermore, the attachment of the connector 55 to the cover 65 needs to be performed.

Modified Example

Figure 13:
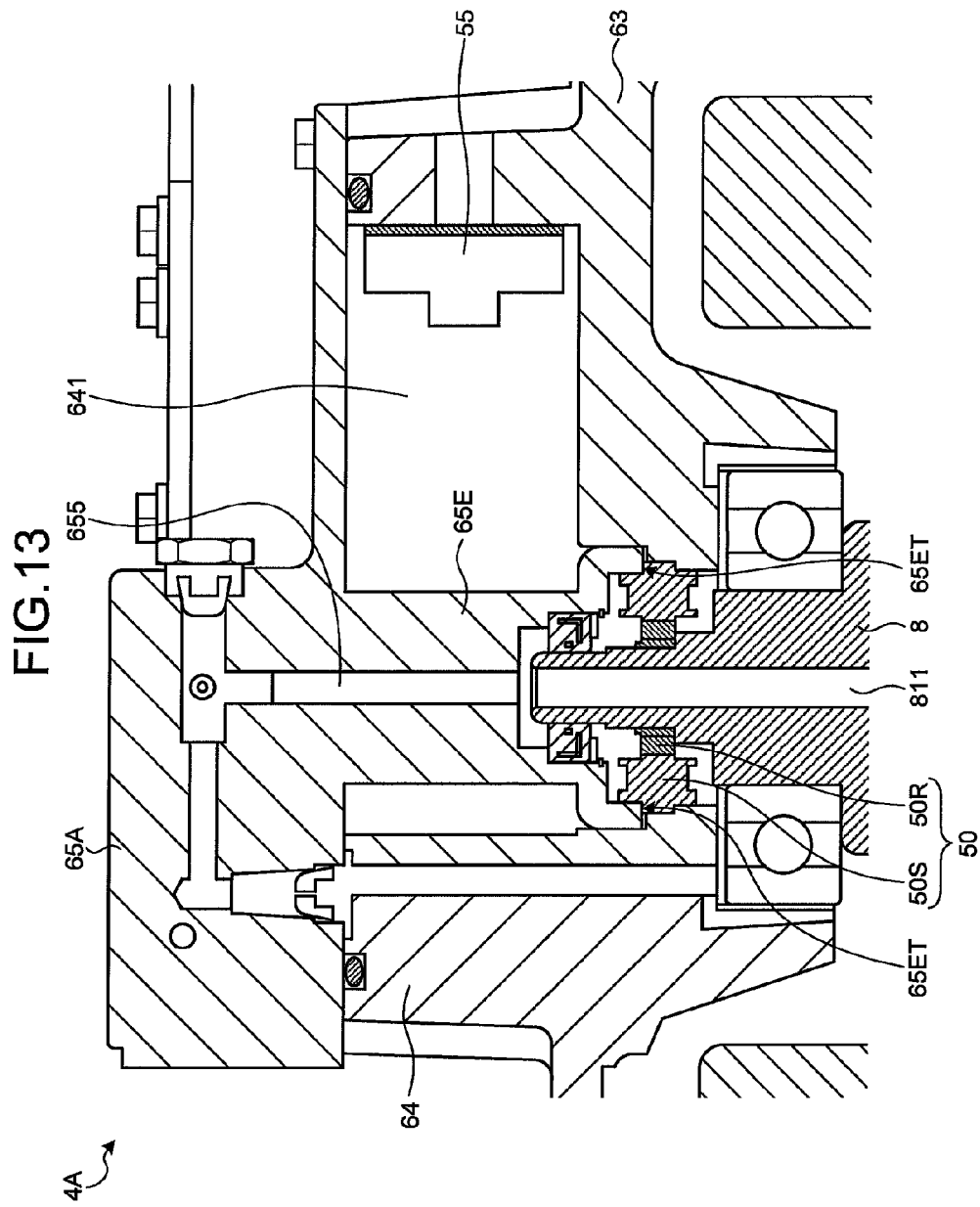
FIG. 13 is an enlarged cross-sectional view illustrating a rotation angle detection sensor holding structure according to a modified example of the embodiment.

FIG. 13 is an enlarged cross-sectional view illustrating a rotation angle detection sensor holding structure according to a modified example of the embodiment. Compared to the resolver holding structure 4 illustrated in FIG. 7, a resolver holding structure 4A has a structure in which the fixation member 54 is omitted by integrally forming the cover 65 and the resolver push 40 with each other. The other structures are the same as those of the resolver holding structure 4. A cover 65A of the resolver holding structure 4A includes a resolver push portion 65E which is pressed against the resolver stator 50S of the resolver 50. The resolver push portion 65E is a portion which extends from the cover 65A toward the resolver 50.

The resolver push portion 65E presses and fixes the resolver 50 to the second flange 63 by causing an end 65ET near the resolver 50 to contact the resolver stator 50S. The resolver push portion 65E includes the second cooling medium distribution passageway 655 therein. The opening near the resolver 50 of the second cooling medium distribution passageway 655 faces the opening of the axial passageway 811 provided in the shaft 8. With such a structure, the resolver push portion 65E may supply the cooling medium from the second cooling medium distribution passageway 655 into the axial passageway 811 of the shaft 8.

Since the resolver holding structure 4A includes the resolver push portion 65E, it is possible to ensure the convex portion space height of the convex portion inside space 641 of the flange convex portion 64. For this reason, the resolver holding structure 4A may improve the operation efficiency by attaching the connector 55 to the flange convex portion 64 as a part of the housing 6 when connecting the resolver terminal 50T to the connector terminal 55T by the signal cable 56 and sealing the convex portion inside space 641 by the cover 65A.

REFERENCE SIGNS LIST

1 ELECTRIC MOTOR
3 COOLING MEDIUM SUPPLY PORTION
4, 4A RESOLVER HOLDING STRUCTURE
6 HOUSING
8 SHAFT
8Ta END SURFACE
8D STEP
9 STATOR
10 HYBRID EXCAVATOR
23 BEARING PASSAGEWAY
28 ROTOR PASSAGEWAY
40 RESOLVER PUSH
40B BODY
40C NOTCHED PORTION
40D STEP
40Ta, 40Tb END SURFACE
40F PROJECTING PORTION
41 COOLING MEDIUM INTRODUCTION PASSAGEWAY
42 GROOVE
43 CONCAVE PORTION
50 RESOLVER
50R RESOLVER ROTOR
50S RESOLVER STATOR
50T RESOLVER TERMINAL
51 OIL SEAL
52, 53 O-RING
54 FIXATION MEMBER
54Ha FIRST OPENING
54Hb SECOND OPENING
54T ROTATION FIXING PORTION
55 CONNECTOR
55S SEAL MEMBER
55T CONNECTOR TERMINAL
56, 56S SIGNAL CABLE
61 HOUSING BODY
62 FIRST FLANGE
63 SECOND FLANGE
64 FLANGE CONVEX PORTION
64B CONVEX PORTION INSIDE SPACE BOTTOM PORTION
64H CONNECTOR ATTACHMENT HOLE
64S GROOVE
64T CONVEX PORTION END SURFACE
65, 65A COVER
65U CONCAVE PORTION
65ET STEP
65E RESOLVER PUSH PORTION
82 ROTOR CORE
91 STATOR CORE
92 COIL
641 CONVEX PORTION INSIDE SPACE
642 ROTATION ANGLE DETECTION SENSOR HOLDING PORTION
643 BEARING SIDE PASSAGEWAY
643A, 643B, 643C, 643D WALL
811 AXIAL PASSAGEWAY
812 RADIAL PASSAGEWAY

The invention claimed is:

1. An electric motor comprising:
a shaft which is attached with a rotor and has an internal cooling medium passageway formed therein so that a cooling medium passes therethrough;
a housing which has the shaft disposed therein and rotatably supports the shaft;
a cooling medium supply portion which is provided inside the housing at a side of one end of the shaft and supplies the cooling medium to the internal cooling medium passageway;
a rotation angle detection sensor which is attached at the side of the one end of the shaft and detects a rotation angle of the shaft;
a push member which includes therein a penetration hole through which the cooling medium supplied from the cooling medium supply portion passes and is interposed between the cooling medium supply portion and the one end of the shaft to guide the cooling medium to the internal cooling medium passageway and presses the rotation angle detection sensor from the side of the one end of the shaft; and
a connector which holds a terminal electrically connected to one end of a signal cable for outputting an output of the rotation angle detection sensor and is attached to the housing.

2. The electric motor according to claim 1,
wherein the housing provided with the cooling medium supply portion includes a concave portion to which the push member is fitted.

3. The electric motor according to claim 2,
wherein the push member is fitted to the concave portion and includes a space between an end surface opposite to a side at which the push member presses the rotation angle detection sensor and the concave portion.

4. The electric motor according to claim 1,
wherein the push member is fixed to the housing by a plate-like member.

5. The electric motor according to claim 1,
wherein the terminal held by the connector is drawn in a direction perpendicular to a rotation center axis of the shaft.

6. An electric motor which rotationally drives an upper swing body of a construction machine, the electric motor comprising:
a shaft which is attached with a rotor and has an internal cooling medium passageway formed therein so that a cooling medium passes therethrough;
a housing which has the shaft disposed therein and rotatably supports the shaft;
a cooling medium supply portion which is provided inside the housing at a side of one end of the shaft and is disposed at an upper side of the housing so as to supply the cooling medium to the internal cooling medium passageway;
a rotation angle detection sensor which is attached at the side of the one end of the shaft and detects a rotation angle of the shaft;
a push member which includes therein a penetration hole through which the cooling medium supplied from the cooling medium supply portion passes and is interposed between the cooling medium supply portion and the one end of the shaft to guide the cooling medium to the internal cooling medium passageway and presses the rotation angle detection sensor from the side of the one end of the shaft;
a plate-like fixation member which fixes the push member to the housing;
a connector which holds a terminal electrically connected to one end of a signal cable for outputting an output of the rotation angle detection sensor and is attached to the housing to draw the terminal in a direction perpendicular to a rotation center axis of the shaft;
a concave portion which is provided in the housing provided with the cooling medium supply portion and is fitted to a part of the push member; and
seal members which are provided between the concave portion and the push member and between the push member and the shaft, respectively.

* * * * *